United States Patent [19]

Bigelow et al.

[11] 4,298,954
[45] Nov. 3, 1981

[54] ALTERNATING DATA BUFFERS WHEN ONE BUFFER IS EMPTY AND ANOTHER BUFFER IS VARIABLY FULL OF DATA

[75] Inventors: George A. Bigelow, Boulder; Ted A. Rehage; Frankie S. Shook, both of Longmont, all of Colo.

[73] Assignee: International Business Machines Corporation, Armonk, N.Y.

[21] Appl. No.: 34,234

[22] Filed: Apr. 30, 1979

[51] Int. Cl.³ ............................................. G06F 3/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 2,905,930 | 9/1959 | Golden | 364/900 |
| 3,020,525 | 2/1962 | Garrison et al. | 364/900 |
| 3,051,929 | 8/1962 | Smith | 364/900 |
| 3,079,590 | 2/1963 | Confeld et al. | 364/900 |
| 3,209,332 | 9/1965 | Doersam, Jr. | 364/900 |
| 3,293,613 | 12/1966 | Gabor | 364/900 |
| 3,344,406 | 9/1967 | Vinal | 364/900 |
| 3,369,223 | 2/1968 | Dryden | 364/900 |
| 3,454,930 | 7/1969 | Schoeneman | 364/900 X |
| 3,573,745 | 4/1971 | May, Jr. | 364/200 |
| 3,588,840 | 6/1971 | Nomura et al. | 364/900 |
| 3,631,406 | 12/1971 | Kurner | 364/200 |
| 3,736,568 | 5/1973 | Snook | 364/900 |
| 3,742,456 | 6/1973 | McFiggans et al. | 364/200 |
| 4,003,027 | 1/1977 | DiMatteo | 364/900 |
| 4,040,027 | 8/1977 | van Es et al. | 364/900 |
| 4,087,626 | 5/1978 | Brader | 364/900 X |

FOREIGN PATENT DOCUMENTS 2002154 2/1979 United Kingdom .

OTHER PUBLICATIONS

West et al., "A Digital Computer for Scientific Application", *Proceedings of the IRE*, Dec. 1948, pp. 1452-1453.

Primary Examiner—Raulfe B. Zache
Attorney, Agent, or Firm—Herbert F. Somermeyer

[57] ABSTRACT

A buffer storage apparatus has two buffers alternating between receiving and supplying data signals. The buffer functions are alternated between the buffers when one of the buffers is empty and another one of the buffers has received a predetermined number of signals even though that data-receiving buffer is not yet full. With data transferred in blocks of data bytes, switching between buffers occurs on the predetermined address boundaries of the data blocks. Alternation of functions between the buffers can occur at any one of a plurality of address boundaries within the data-receiving one of the buffers. By using a plurality of such buffer storage apparatus to connect individual data burst units to a plural-port high-speed common unit, each data burst unit has a high speed buffered access to the high speed common unit.

21 Claims, 6 Drawing Figures

ALTERNATING DATA BUFFERS WHEN ONE BUFFER IS EMPTY AND ANOTHER BUFFER IS VARIABLY FULL OF DATA

BACKGROUND OF THE INVENTION

The present invention relates to buffering data signals and more particularly to providing a wideband buffer system.

Buffering data signals between units or systems having different data rates for rate changing is well known. A particular version of such buffering for enhanced buffering functions includes alternating between two buffer units. For example, while a first buffer unit is receiving signals to be buffered, a second buffer unit is supplying signals that were previously received. When the one buffer is empty and the other buffer is full, then the functions are alternated between the buffer units. Such a system is shown in Garrison et al, U.S. Pat. No. 3,020,525.

In any buffering application, it is desired to have as wide a bandwidth of data transfer as possible at lowest cost. A wide data bandwidth can be achieved by making the buffer larger. However, when a buffer is larger, the cost is increased. Therefore, it is desired to have a relatively wideband buffer for a minimal size buffer unit such that maximal performance can be achieved with minimal cost.

SUMMARY OF THE INVENTION

Alternating buffer apparatus constructed in accordance with the invention includes a plurality of register sets with switching means for alternatively accessing the register sets for receiving and delivering data signals. Addressing means indicate when the various register sets have data signals in predetermined ones of the registers. Each of the register sets also include ready means indicating that a predetermined number of registers have data signals for indicating their readiness to switch whenever another register set is empty; such that the empty register set can receive signals while the switching register set can deliver signals before it is full, thereby increasing the data bandwidth.

A plural ported apparatus incorporates a plurality of such alternating data buffer sets such that various inputs to a high speed unit via the wideband buffer sets to enhance data transfer through the plurality of ports for making the high speed unit more accessible to each and every one of the ports. Such apparatus constitutes an improved signal burst accommodating means.

The foregoing and other objects, features, and advantages of the invention will be apparent from the following more particular description of the preferred embodiments of the invention, as illustrated in the accompanying drawings.

THE DRAWINGS

DETAILED DESCRIPTION

Figure 1:
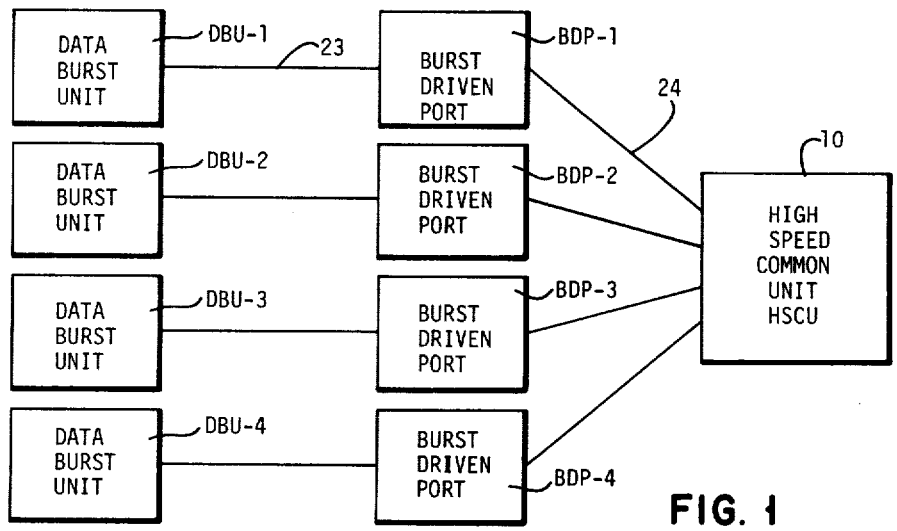
FIG. 1 is a diagrammatic showing of a plural ported system incorporating the teachings of the present invention.

Referring now more particularly to the drawing, like numerals indicate like parts and structural features in the various diagrams. In FIG. 1, a high speed common unit 10, which may be a random access memory unit, is connected to a plurality of data burst units, DBU-1, etc., via a like number of burst driven ports, BDP-1 et al. Such data burst units can include magnetic tape units, digital computers, slower speed random access memories, communication lines and the like. It is desired that the operation of the high speed common unit (HSCU) 10 be such that each of the DBU's have an apparent exclusive access to the HSCU 10 even though other DBU's are using it. This apparent exclusivity is achieved by providing a burst driven port BDP between each of the data burst units DBU and HSCU 10.

Figure 2:
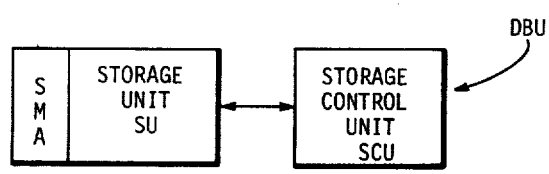
FIG. 2 is a diagram of a high speed common unit of FIG. 1 configured as a storage subsystem.

As an example, FIG. 2 a data burst unit DBU includes a storage control unit (SCU) attached to a storage unit (SU). A storage unit SU can be a magnetic tape or disk unit, for example, which will include a storage media assembly (SMA). In general, such devices when transferring signals require a long burst of signals for maximal efficiency. Intermittent operations require interleaved time consuming mechanical motions which reduce unit efficiency.

Figure 3:
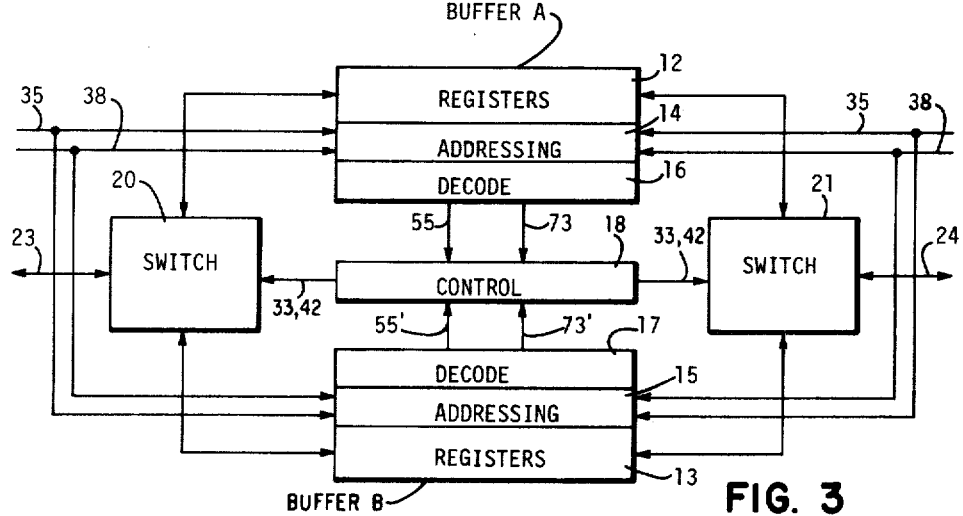
FIG. 3 is a simplified diagrammatic showing of a burst driven port in the FIG. 1 illustrated embodiment and adapted to show principles of the present invention.

FIG. 3 illustrates a data burst accommodating port BDP for bilateral communication; i.e., data flow is in either direction as selected by means (not shown) external to the port. In the illustrated embodiment, the burst driven port consists of two separate buffers or register sets 12, 13 which are controlled to appear as one logical buffer. These separate buffers 12, 13 accumulate data in preparation for storing it in HSCU 10. This action allows for any number of data burst units to be attached to HSCU 10 as determined by the balance of the data burst unit data rate and the HSCU 10 data rate. In one embodiment, each of the buffers 12, 13 has 16 registers. Each of the registers has a predetermined number of bits for storing data, a smaller number of bits for storing error detection correction bits and an additional bit position for storing a mark bit. The mark bit points to the logical end of a data transfer, i.e., the end of a data block. In any practical embodiment, the number of registers, i.e., the buffer size, is determined by the access time of HSCU 10 as measured by each of the data burst units and the rate at which data signals actually arrive at the burst driven port.

Each of the registers in buffers 12, 13 is accessed via addressing circuits 14 and 15, respectively. Decodes 16 and 17 are respectively attached to the addressing circuits for decoding which registers in buffers 12, 13 have data stored therein for transmission to a receiving unit, such as HSCU 10. The decodes 16,17 in turn supply decoded signals to a control 18 which in turn operates the two switches 20 and 21 for alternating data transfer between buffers 12 and 13 and external units. When buffer 12 is supplying signals to HSCU 10, buffer 13 is receiving signals from a DBU; and vice versa. Alternation is switching the above described functions. In transferring signals from HSCU 10 to a DBU, a similar alternation occurs, as is well known. Each of the switches 20 and 21 is respectively connected to data busses 23 and 24 for transferring signals as shown in one of the port connections of FIG. 1. It is preferred that the number of lines in busses 23, 24 be equal to the number of data bits in each of the registers of register sets 12, 13. The usual error correction circuitry and other control circuitry are not shown for purposes of brevity.

In accordance with the invention, decode circuits 16, 17 detect when receiving register sets 12, 13 have received sufficient data signals without being full to enable switching buffers for increasing the bandwidth of the alternating buffer system. In this regard, each of the buffers 12, 13 is arbitrarily divided into four-register sections; each four-register section constitutes an alternation point for alternating the data transfer directions between buffers 12, 13. That is, at each four register boundary or alternation point decodes 16, 17 can actuate control 18 to determine whether or not the other one of register sets 12, 13 is empty. The buffer empty signal from either decode 16 or 17 is combined with a ready signal from the other decode to actuate control 18. For example, if buffer 13 is empty when buffer 12 is ready to switch, then the buffers 12, 13 are alternated by the actuation of switches 20, 21 by control 18. At this point, buffer 13 then begins to receive data signals while buffer 12 supplies data signals. In the reverse sense, when buffer 13 has received data signals up to a transfer or alternation point which yields a ready signal from decode 17, control 18 then responds to the decode 16 empty signal to actuate switches 20, 21. In this manner, it is not necessary for the receiving buffer, set either 12 or 13, to be completely full before alternation. By alternating before a receiving register set is full, the just received data signals can be supplied sooner, thereby widening the bandwidth of the buffer system. It is to be understood that the invention is not limited to pure alternation between two buffers, such as register sets 12 and 13 but that 3 and 4 or more sets of buffers can be sequentially scanned in accordance with the present invention.

Since the buffers 12 and 13, are independent; simultaneous write and read operations occur. This arrangement enables the buffers 12 and 13 to operate in a longer cycle time than would be required if a time sliced single physical buffer were employed. Therefore, it is seen that reduced access time to data supplied to the buffer system is accomplished by the receiving buffer switching to the supply state before becoming completely filled. This arrangement also allows and compensates for variability in incoming data rates.

While the illustrated embodiment shows four alternation points, no limitation thereto is intended; for example, for maximizing the bandwidth switching, alternation can occur at any register.

Figure 4:
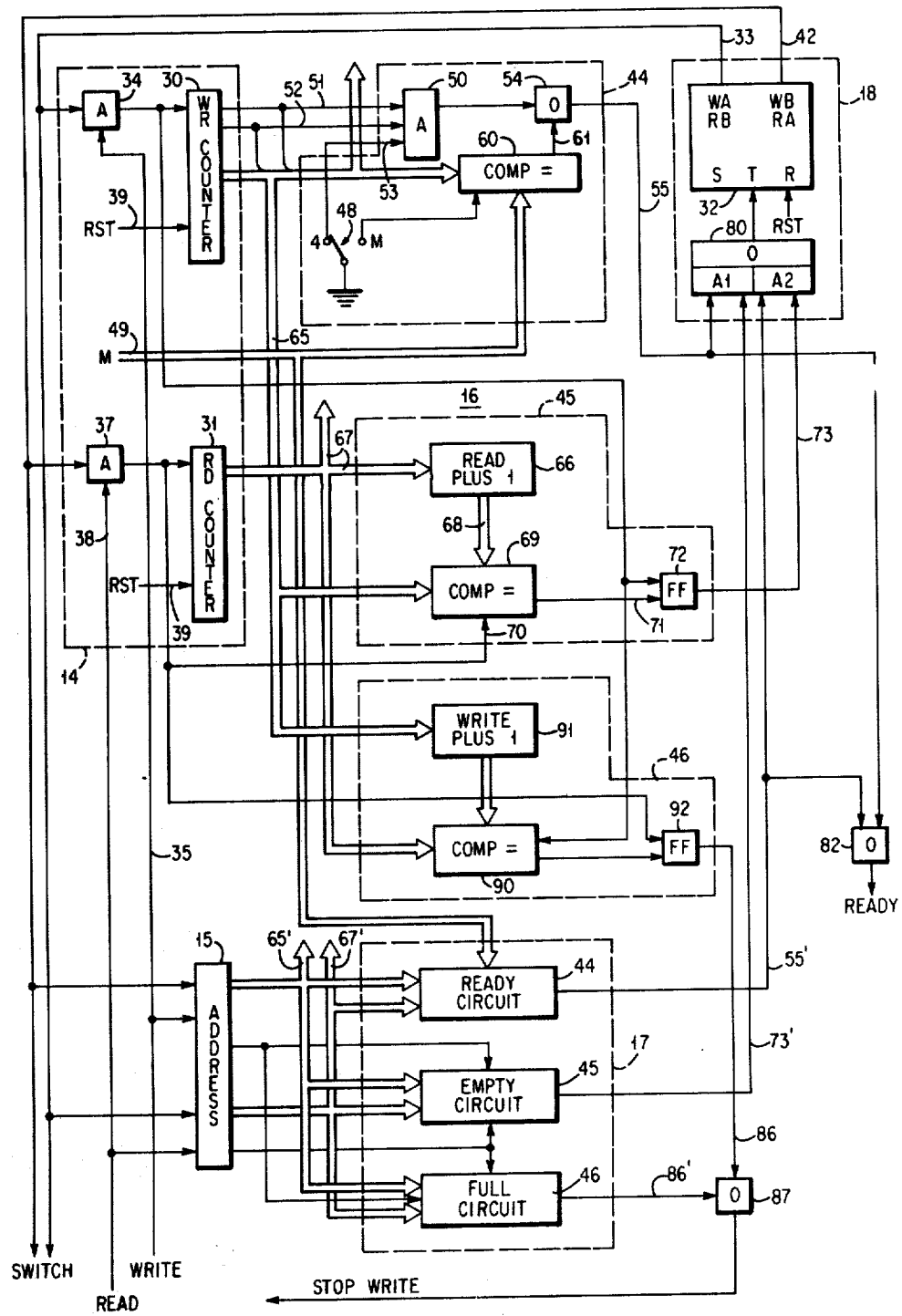
FIG. 4 is a logic diagram illustrating operation of a burst driven port of FIG. 1.

FIG. 4 illustrates decodes 16, 17 and control circuit 18 for enabling the dynamically variable alternation of the present invention. In particular, decode 16 is shown in detail, it being understood that decode 17 is similarly constructed but which is shown in abbreviated form. Addressing circuits 14 and 15 are shown with their detail connections to the decode circuits 16 and 17.

Each of the addressing circuits has a write counter 30 which indicates the register for receiving data signals and a read counter 31 which indicates the register from which signals are obtained. In any data transfer operation, either the write counter 30 or the read counter 31 is used in each of the addressing circuits 14 and 15. Control 18, which includes a buffer selection latch 32 selects which counter is to be used. In control 18, register set 12 is designated as buffer A, and buffer 13 is designated as buffer B; latch 32 being in the WA, RB state indicates that data signals will be written into buffers 12 (buffer A) while data signals will be read from buffer B, register set 13.

An active signal on line 33 (WA, RB) enables AND circuit 34 in address circuit 14 to actuate write counter 30 to be stepped each time a write signal is received over line 35. That is, a data burst unit DBU-1 or HSCU 10 supplying signals indicates when a signal is available by actuating write line 35. In this situation, data signals are written into buffers 12 (buffer A) while data signals will be read from buffer B, register set 13. In a bilateral transfer, the signal on line 35 comes from either HSCU 10 or data burst unit DBU. The selection of data transfer direction is beyond the scope of the present description and is well known in the data processing arts. A timed signal on line 35 passes through AND gate 34 to increment write counter 30 to select the next register of register set 12 for receiving the next data signals. Since there is also a read function for buffer B, the line 33 is also connected to address circuits 15 wherein the activating signal activates an AND circuit (not shown) for actuating the read counter (not shown) in address circuits 15. Address circuits 15 are identical to address circuits 14. In address circuit 14, AND circuit 37 receives a timing pulse from the read line 38 which receives a read signal from either HSCU 10 or the data burst unit DBU to actuate read counter 31 to indicate the next register to be accessed. Both counters 30 and 31 and address circuits 14, 15 are resettable by the reset signals on line 39 for setting the counters 30, 31 to a reference state at a start-up of operations.

To write in buffer B (13) and read from buffer A (12) latch 32 is triggered to the opposite state such that an active signal is supplied over line 42 to AND circuit 37 of address circuit 14 and the AND circuit (not shown) of address circuits 15 corresponding to AND circuit 34 of address circuits 14. A disabling signal now appears on line 33 for degating AND circuit 34 and address circuits 15 in the read mode.

The decodes 16 and 17 are identical and each consists of three circuits; a ready circuit 44, an empty circuit 45 and a full circuit 46. The circuits are detailed and explained for decode 16, operation of the decode 17 is identical to decode 16. Each ready circuit 44 and the full circuits 46 operate when the corresponding buffer 12, 13 is receiving signals (being written into) while empty circuits 45 operate when the corresponding buffer is supplying signals (being read).

When buffer 12 is receiving signals, ready circuit 44 receives the signal contents of write counter 30 for determining when buffer 12 has registers filled to an alternation point. As previously mentioned, the selection of the alternation point determines the bandwidth of the buffer. Accordingly, ready circuit 44 is programmable by a single-pole double-throw switch 48 for selecting alternation points every fourth register or every Mth number of registers. M is selected by signals received over cable 49 from a control console (not shown) for example. Assume that programming switch 48 is set to the four state, then each alternation point is at any fourth register. In a sixteen register buffer 12, there are four alternation points. Such alternation points are decoded by AND circuit 50 receiving the bit 0 and bit 1 signals over lines 51 and 52 from write counter 30. The signal on line 53 from switch 48 enables AND circuit 50 to pass the alternation point indication on lines 51 and 52 through OR circuit 54, thence to ready line 55 as a ready signal. Ready line 55 goes to control 18 and is used as will be described. Decode 17, ready circuit 44 supplies a ready signal over the second ready line 55'.

When the number of alternation points is to be changed from four, programming switch 48 is set to the M terminal for selecting compare equal circuit 60 to generate a ready signal on line 61. The line 61 ready signal goes through OR circuit 54 to ready line 55. In this instance all of the bit positions of write counter 30 are supplied to compare equal circuit 60 which also receives the signals supplied over cable 49. When the bit pattern on cable 49 equals the bit pattern of write counter 30, the ready signal on line 61 is generated as is known for compare equal circuits.

The second condition for alternation is when the other buffer 13 supplying signals is empty. It will be noted that the write counter 30 is actuated only when data signals are being written into its corresponding buffer 12. When buffer 12 is supplying the signals, the numerical content of write counter 30 remains the same. Therefore, write counter 30 then indicates the last register position which contains data signals. This indication is supplied over cable 65 to empty circuit 45 and compared with the numerical contents of read counter 31. As signals are transferred from buffer 12, read counter 31 is incremented toward the numerical count in write counter 30. Because of the speed of switching, it is desired to have a one register look-ahead for alternating between the buffers 12 and 13. The +1 circuit 66 receives the numerical contents of read counter 31 over cable 67, adds 1 to such numerical contents and then supplies such contents +1 over cable 68 to compare equal circuit 69. Compare equal circuit 69 also receives write counter 30 signals on line 65. Each time AND circuit 37 supplies an incrementing pulse to read counter 31, that pulse is also supplied over line 70 to actuate compare equal circuit 69. When the signal contents on cable 68 equal the signal contents of write counter 30, compare equal circuit 69 supplies an actuating signal over line 71 to set flip flop 72 to the active condition to supply an empty signal over line 73 to control 18. Similarly, empty circuit 45 in decode 17 supplies a similar empty signal over line 73' to control circuit 18. In another embodiment of the invention, flip flop 72 can be a D-type latch. In such a situation line 70 is then connected to the C input of the D-type latch with the line 71 connected to the D input. Also, compare equal circuit 69 can then be a DC translator for making a comparison between the cable 68 signals and the signal contents of write counter 30.

Control circuit 18 responds to the decodes 16 and 17 to alternate the buffers 12, 13. AND-OR (AO) circuit 80 decodes the ready and empty signals from decodes 16 and 17 for triggering control latch 32 to effect such alternation. The A1 AND input portion of AO 80 supplies an activating signal to trigger latch 32 whenever the line 55 ready signal and the line 73' empty signal are activated. In this situation, the line 33 signal was active and latch 32 should be switched to activate line 42. Returning to activating line 33, the A2 AND input portion of A0 80 responds to the line 73 empty signal and the line 55' ready signal to toggle latch 32. An alternate connection is to connect the A1 AND input portion to the reset input R and to connect the A2 AND input portion directly to set input S of latch 32.

The lines 33 and 42 signals also go to switches 20, 21 for actuating same as is well known in the data processing art. Further, the lines 55 and 55' signals are combined in OR circuit 82 to supply a single ready signal to the switches 20, 21 for priming same to switch whenever an empty signal is received.

The empty latch 72 is reset to remove the ready signal on line 73 when the AND circuit 34 supplies its first pulse to write counter 30; that is, the first data is being written into a register of buffer 12 at the address indicated by write counter 30. Then buffer 12 is no longer empty; the empty signal on line 73 should be erased.

It is possible in any buffering situation that overwrite can occur. This error is prevented by the respective full circuit 46 detecting via address circuit 14 that all registers in a buffer 12, 13 that are receiving data signals are full. Circuit 46 then supplies a stop write signal over line 86 through OR circuit 87 to both the connected units HSCU-10 and DBU. Similarly, full circuit 46 of decode 17 supplies a stop signal over line 86'. Each full circuit 46 includes a compare equal circuit 90. This circuit in decode 16 detects equality between the signal contents of write counter 30, plus one as supplied from write plus 1 circuit 91, and the numercial contents of read counter 31, as received over cable 67, to set stop latch 92 to the active condition. Latch 92 supplies a stop signal over line 86 to stop the writing into buffer 12. Latch 92 is reset whenever AND circuit 37 supplies an activating pulse to increment read counter 31 which then removes the data from the register which would be written into next. Immediately the stop write signal is removed enabling the next data signals to be written into the selected buffer. In this manner, the write counter 30 can track the read counter 31 very closely without the danger of overwriting. The numerical contents of the write and read counters repesented by the signals on cables 65, 65' and 67, 67' are respectively sent to the buffers 12 and 13 for addressing same as is well known. The full circuit 46 of decode 17 operates identically with address circuit 15.

In FIG. 3, lines 35 and 38 are separated into two parts, it being understood that an AND/OR circuit (not shown) combines the signals respectively on the single lines 35 and 38 as shown in FIG. 4.

Figure 5:
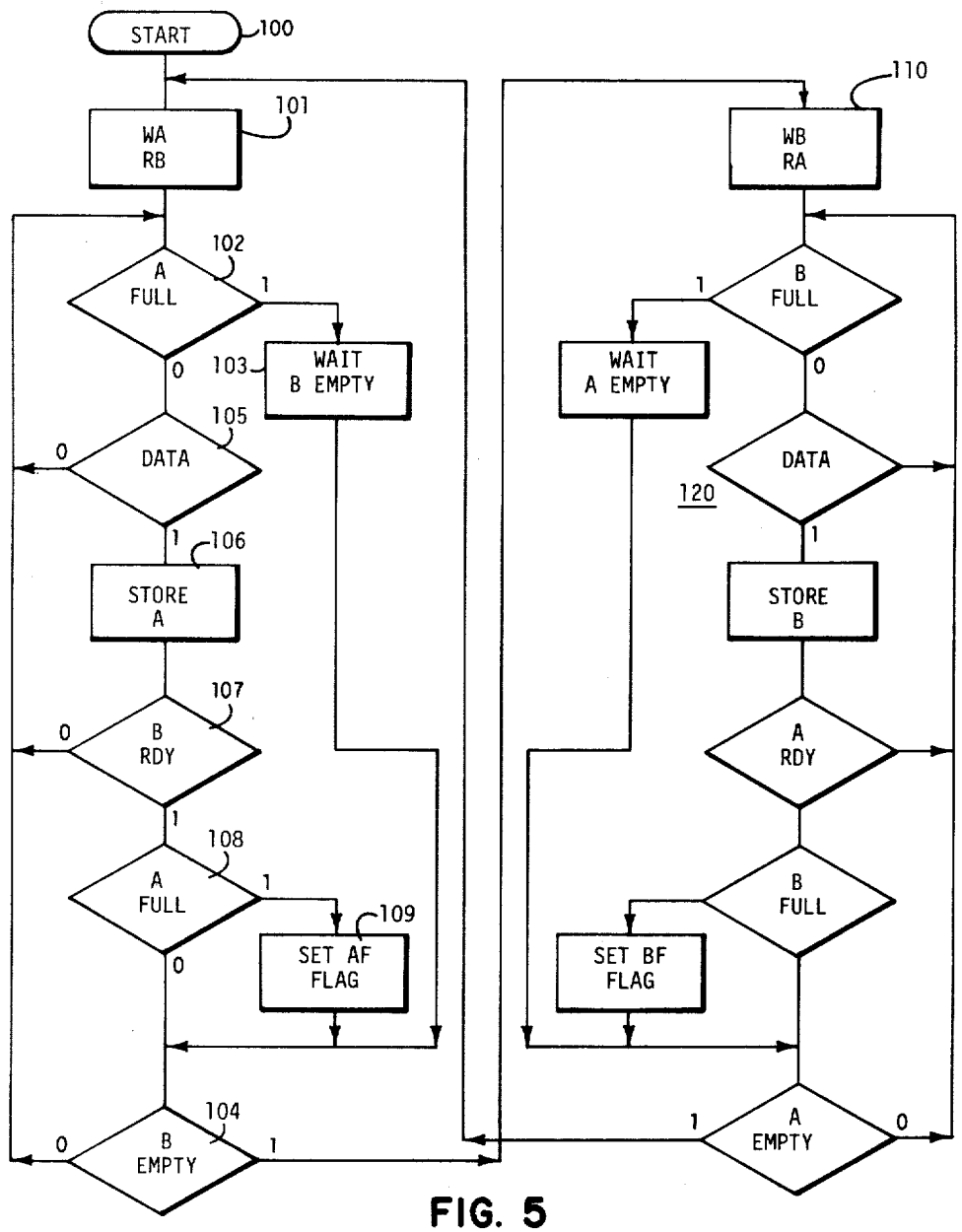
FIG. 5 is a flow chart of a burst driven port of FIG. 1.

FIG. 5 shows the logical operations described with respect to the FIG. 4 circuit. In this regard, the control shown in FIG. 4 may be implemented in a programmable logic array, as a sequence of programmed operations in a microcomputer or other programmed logical devices. All such implementations are within the scope of the present invention. The FIG. 5 flowchart, as shown, assumes buffer B has been first loaded with data signals. Start 100 is a sequence entry before each byte transfer. In the flow chart of FIG. 5, after start at 100, the first operation 101 writes into buffer A and reads from buffer B, designated as WARB in block 101. Of course, when first starting buffer B is empty, therefore it is not read out, making step 101 WA. Then the programmed unit (not shown) at 102 determines whether or not buffer A is full. If it is full, it must wait for a buffer B empty indication such as is determined at 103 and sensed at 104. If A is not full, then the programmed unit at 105 determines whether or not data is to be supplied. If not, a wait loop including steps 102 and 105 is entered. However, if data is available, as indicated by the write signal on line 35 at 106, data signals are stored into registers 12 (buffer A). Then the programmed unit (not shown) determines at 107 whether or not buffer B (13) is ready.

This action corresponds to the detection of the ready signal on line 55. If the alternate buffer is not ready, then another data signal is entered into buffer A. However, if the ready signal is active at 107, then the programmed unit (not shown) determines at 108 whether or not A is full; if it is full, the A full (AF) flag is set at 109 and step 104 executed. If buffer A is not full, then step 104 is directly executed. The alternation of the buffers precedes from branch step 104 which occurs only after B is ready or B is empty (step 103). If B is empty at 104, then the buffers are alternated by setting write B (WB) and read A (RA) at 110. The steps collectively designated by numerical 120 are identical to steps 101-109 except the operations are complementary as to buffer A, B as can be seen from the inspection of the drawings.

Figure 6:
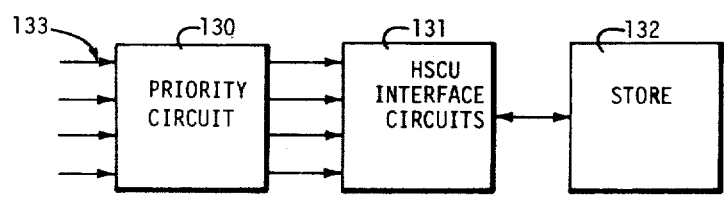
FIG. 6 illustrates a connection between the priority circuits and the store of the FIG. 2 illustrated version of a high speed communication unit whereby ports are selected in accordance with a predetermined priority.

When, as shown in FIG. 6, a high speed common unit 10 is operating with several ports, some priority has to be achieved. A simplified priority results when HSCU 10 is four times as fast as any one of the burst units. The speed difference would be the average speed, not peak speed. Accordingly, each port would have one out of 4 time slices of HSCU 10, as is known and as determined by a priority circuit 130. Circuit 130 can be a time slicer which activates the HSCU interface circuits 131 to control the storage portion 132. The priority circuit 130 receives requests for access to store 132 over access request lines collectively enumerated by number 133, such as from OR circuit 82 of FIG. 4, which are understood to be received from burst driven ports BDP-1 through BDP-4. Other forms of priority circuits can be used with equal efficiency. It is to be understood that when HSCU 10 has a given average data rate speed, the burst units DBU-1 through DBU-4 each may have a peak rate greater than the HSCU-10 average data rate.

It is to be understood also that the principles of the present invention can be used in connection with any form of concentrator wherein a high speed unit or line that is overseeing a plurality of burst units and that the buffer arrangement of each of the burst driven ports can be used individually as well as in cooperation with other such units. Further, as the burst units vary in rate, the buffer size and alternation points of the buffers in the various ports may be adapted to the characteristics of the diverse burst units.

While the invention has been particularly shown and described with reference to the preferred embodiments thereof, it will be understood by those skilled in the art that various changes in form and details may be made therein without departing from the spirit and scope of the invention.

What is claimed is:

1. In a data path concentrator for connecting a high speed unit to a plurality of signal burst units for transferring signals in bursts of such signals therebetween, the improvement comprising:

a plurality of electrical signal burst accommodating means respectively for connecting said signal burst units to said high speed unit;

each said accommodating means comprising a plurality of switchable buffer means for receiving and temporarily storing signals being transferred and having control means responsive to a one of said buffer means therein which is receiving signals which partially fill such receiving means to a given intermediate filled state buffer to switch signals being received from said one of said buffer means to another of said buffer means in such accommodation means whenever said another buffer means is empty and means responsive to the predetermined data activities of all of said units for selectively activating said accommodating means to buffer bursts of signals, whereby all said signal burst accommodating means may simultaneously receive signals for transfer between said high speed unit and respective ones of said signal burst means at maximal data transfer rates.

2. The concentrator set forth in claim 1 wherein in each of said accommodating means each said buffer includes empty indicating means for indicating no signals being stored in a respective buffer means, and each said control means of each said accommodating means being jointly responsive to said given intermediate filled state and to an empty indicating means in such accommodating means to switch said signals being received thereby to another of said buffer means therein, respectively.

3. In a buffered signal exchange apparatus for being coupled to a data signal receiving apparatus to receive data signals supplied by the buffer signal exchange apparatus, comprising in combination:

a plurality of buffer register sets, each of said buffer register sets having a given number of addressable registers to store signals being buffered and a ready means indicating data signals being received have filled a predetermined number of said addressable registers which predetermined number is less than said given number;

signal means connected to all said sets for supplying data signals thereto for buffering and connected to said sets for transfer to said data signal receiving apparatus by supplying buffered data signals thereto;

control means connected to said sets for indicating that a given one of said sets is receiving signals to be buffered;

means connected to all said buffer register sets for being responsive to all said ready means except said ready means in said given one set and to said control means indicating said given one said set is receiving signals to electrically indicate that a said set other than said given one set is to receive signals to be buffered irrespective of whether or not said given one set has received said signals to be buffered up to said given number of registers; and electronic switch means electrically interposed between all said sets and said signal means and being responsive to said responsive means said electrical indication to connect said register sets and said signal means in accordance with said responsive means indication whereby a maximal data transfer bandwidth is provided by said buffer register sets for data signals being transferred therethrough.

4. The apparatus set forth in claim 3 further including empty indicating means to electrically indicate when a one of said buffer register sets supplying data signals is empty of said data signals being supplied and said responsive means being jointly responsive to a said ready means and said empty indicating means respective indications of said predetermined number of said addressable registers being filled with data signals received to be buffered and if said one buffer register set supplying data signals is empty of said data signals being supplied to indicate said one of said buffer register sets supplying data signals is to receive signals instead of said given buffer register set.

5. The apparatus set forth in claim 4 wherein each said ready means indicates said number of registers as a number which is submultiple of said given number for the respective buffer register sets.

6. The apparatus set forth in claim 5 wherein each said ready means includes means to select said indicated number of registers.

7. The apparatus set forth in claim 6 wherein each of said plurality of buffer register sets includes means for receiving a unit size of data transfer such that said indicated number of registers is derived from a data transfer unit size to be used with said respective buffer register set.

8. In alternating data buffer apparatus having first and second register sets, switch means connected to said register sets for switching access thereto for respectively receiving or delivering data signals, each register set having a predetermined number of addressable registers for storing data signals;

the improvement including in combination:
decoding means connected to said register sets for indicating when one of said register sets has data signals stored in any one of a plurality of a given numbers of said registers therein, said given number being less than or equal to said predetermined number, and for indicating when a second of said register sets has no data stored therein, said one register set receiving data signals; and control means connected to said decoding means and said switch means and being responsive to said indications to activate and said switch means to alternate access to said register sets such that said one register set now delivers stored data signals from said given number of registers whereby alteration between said first and second register sets access at a maximal frequency with successive alternations occurring at diverse ones of said given numbers.

9. The apparatus set forth in claim 8 further including program means in said decoding means for selectively controlling operation thereof.

10. The apparatus set forth in claim 9 further including address means indicating write and read addresses in each said register sets, and compare means in each said decoding means respectively connected to said address means for generating said indications of said given number and no data stored.

11. The apparatus set forth in claim 10 wherein said compare means includes address look ahead means for indicating said given number and no data stored before a data transfer operation.

12. The apparatus set forth in claim 8 further including:

data means for initiating a data operation with respect to said register sets and for resetting said decoding means indications upon initiation of such data data operation.

13. The apparatus set forth in claim 8 further including means detecting a data full state in one of said register sets and inhibiting further data operations of receiving data signals by said one register set and said decoding means having memory means maintaining said given number indication for said one register set at least until a second one of said register sets has no data.

14. In an alternating data buffer apparatus having first and second register sets, each set having a predetermined number of addressable registers, and switch means for alternatively accessing said register sets for receiving and delivering data signals, the improvement including in combination:

first and second addressing means respectively indicating which registers of said first and second register sets, respectively, contain data signals in said register sets;

first and second ready means responsive to said first and second addressing means indications of which registers of said first and second register sets contain data signals, respectively, for indicating that said register sets have a given number of registers containing data signals, said given number being an integral submultiple, including unity, of a whole number less than a number of registers in said register sets; and control means responsive to either of said ready means indicating that said register sets have a given number of registers containing data signals to actuate said switch means to alternate access to said register sets whereby alternations between said first and second register sets can occur at a frequency greater than if a register set receiving data signals to be buffered were filled with said data signals being received by said register set receiving data signals before such alternation occurs.

15. The apparatus set forth in claim 14 wherein each said addressing means has a write counter for indicating a register address of a register for receiving data signals, and a read counter for indicating a register address of a register for supplying data signals.

16. The apparatus set forth in claim 15 wherein each said ready means includes a compare means connected to a respective one of said write counters and each said compare means being respectively responsive to said write counters signal contents to supply said given number indication.

17. The apparatus set forth in claim 16 wherein each said compare means includes an AND circuit connected to predetermined portions of said respective write counters and said predetermined portions respectively having a count value equal to said given number.

18. The apparatus set forth in claim 15 further including first and second compare means connected to said write counter and said read "counter," respectively, of said first and second addressing means, each said compare means being responsive to said write counter and said read counter in said respective addressing means to supply a respective first and second switch controlling signal to said control means, and said control means being responsive to said given number indication only when receiving one of said switch controlling signals.

19. The apparatus set forth in claim 18 wherein each said compare means includes an add one circuit means for adjusting the signal contents received from said respective read counter for supplying said switch controlling signal before ensuing data operation.

20. The machine-implemented method of operating a data memory having a predetermined number of addressable registers, comprising the automatic machine-executable steps of:

dividing said registers into two groups of registers,
writing data signals received from a data signal sourcing apparatus while reading data signals from a second group of said registers, and transferring said read data signals to a data signal receiving apparatus, sensing when data signals being read from said second group have been completely read out, dividing each said group of registers into a plurality of blocks of registers, sensing when said one group of registers has received data signals filling any integral number of said blocks of registers, and when data signals being read from said second group of registers have been completely read out and said one group of registers has any number of blocks filled with said data signals being written, switching accessing of said groups such that said one group of registers is to be read from while said second group of registers is to be written into.

21. The machine-implemented method set forth in claim 20 further including the automatic machine-executable steps of selecting a number of registers for each block of registers in accordance with a number of data signals to be transferred as a minimal number of data signals.

* * * * *